United States Patent
Gao et al.

(10) Patent No.: US 10,256,910 B2
(45) Date of Patent: Apr. 9, 2019

(54) CONTROL AND MANAGEMENT OF PASSIVE OPTICAL NETWORK REACH EXTENDERS

(71) Applicant: Futurewei Technologies, Inc., Plano, TX (US)

(72) Inventors: Bo Gao, Wuhan (CN); Yuanqiu Luo, Cranbury, NJ (US); Wei Lin, Wuhan (CN); Frank Effenberger, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/938,858

(22) Filed: Mar. 28, 2018

(65) Prior Publication Data

US 2018/0309518 A1    Oct. 25, 2018

Related U.S. Application Data

(60) Provisional application No. 62/489,297, filed on Apr. 24, 2017.

(51) Int. Cl.
| | | |
|---|---|---|
| *H04B 10/29* | (2013.01) | |
| *H04B 10/079* | (2013.01) | |
| *H04J 14/02* | (2006.01) | |

(52) U.S. Cl.
CPC ....... *H04B 10/29* (2013.01); *H04B 10/07955* (2013.01); *H04J 14/0227* (2013.01)

(58) Field of Classification Search
CPC ............... H04B 10/29; H04B 10/07955; H04J 14/0227
See application file for complete search history.

(56) References Cited

U.S. PATENT DOCUMENTS

| | | |
|---|---|---|
| 2011/0085799 A1 | 4/2011 | Mizutani |
| 2012/0230684 A1 | 9/2012 | Effenberger et al. |
| 2014/0186043 A1 | 7/2014 | Kim et al. |

FOREIGN PATENT DOCUMENTS

| | | |
|---|---|---|
| CN | 101971528 A | 2/2011 |
| EP | 2413518 B1 | 1/2016 |

OTHER PUBLICATIONS

Foreign Communication From a Counterpart Application, PCT Application No. PCT/CN2018/081341, English Translation of International Search Report dated Jun. 22, 2018, 5 pages.

(Continued)

*Primary Examiner* — Leslie C Pascal
(74) *Attorney, Agent, or Firm* — Conley Rose, P.C.

(57) ABSTRACT

Methods and apparatus are provided for identifying a connection between a reach extender channel termination (RE-CT) and an optical network unit (ONU). A method performed by an optical line terminal (OLT) for identifying a connection between a RE-CT and an ONU includes transmitting, by the OLT, a dynamic bandwidth allocation (DBA) grant to the ONU via a multi-channel termination reach extender (MCRE), retrieving, by the OLT from the MCRE, recorded optical signal power measurements associated with an upstream transmission by the ONU, and identifying, by the OLT, the RE-CT of the MCRE that is connected to the ONU by correlating the recorded optical signal power measurements associated with the upstream transmission by the ONU with the DBA grant.

28 Claims, 7 Drawing Sheets

(56) References Cited

OTHER PUBLICATIONS

Foreign Communication From a Counterpart Application, PCT Application No. PCT/CN2018/081341, English Translation of Written Opinion dated Jun. 22, 2018, 4 pages.
"10 Gigabit-Capable Passive Optical Networks (XG-PON): Reach Extension," Series G: Transmission Systems and Media, Digital Systems and Networks—Digital Sections and Digital Line System—Optical Line Systems for Local and Access Networks, ITU-T G.987.4, Jun. 2012, 46 pages.
"40-Gigabit-Capable Passive Optical Networks (NG-PON2): Transmission Convergence Layer Specification," Series G: Transmission Systems and Media, Digital Systems and Networks—Digital Sections and Digital Line System—Optical Line Systems for Local and Access Networks, ITU-T G.989.3, Oct. 2015, 250 pages.
"10-Gigabit-Capable Symmetric Passive Optical Network (XGS-PON)," Series G: Transmission Systems and Media, Digital Systems and Networks—Access Networks—Optical Line Systems for Local and Access Networks, ITU-T 3.9807.1, Jun. 2016, 286 pages.
"10-Gigabit-Capable Passive Optical Network (XG(S)-PON): Reach Extension," Series G: Transmission Systems and Media, Digital Systems and Networks—Access Networks—Optical Line Systems for Local and Access Networks, ITU-T G.9807.2, Aug. 2017, 48 pages.
"ONU Management and Control Interface (OMCI) Specification," Series G: Transmission Systems and Media, Digital Systems and Networks—Digital Sections and Digital Line System—Optical Line Systems for Local and Access Networks, ITU-T G. 988, Oct. 2010, 552 pages.

CONTROL AND MANAGEMENT OF PASSIVE OPTICAL NETWORK REACH EXTENDERS

CROSS-REFERENCE TO RELATED APPLICATIONS

This application claims priority to U.S. Provisional Patent Application No. 62/489,297 filed Apr. 24, 2017 by Bo Gao and titled "Control and Management of Passive Optical Network Reach Extenders," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention disclosure relate to the field of telecommunications, and in particular, to a method and an apparatus for providing control and management of Passive Optical Network Reach Extenders.

BACKGROUND

A passive optical network (PON) is a telecommunications network that used is to provide fiber to the end consumer. A PON implements a point-to-multipoint architecture, in which unpowered (i.e., passive) fiber optic splitters are used to enable a single optical fiber to serve multiple end-points. PONs may also comprise a reach extension device/reach extender (RE) located between the optical line terminal (OLTs) and the optical network unit (ONUs), for extension of PON transmission distance. The International Telecommunications Union-Telecommunication Standardization Sector (ITU-T) G.9807.2 outlines the architecture and interface parameters for 10 Gigabit-capable symmetrical passive optical network (XG(S)-PON) systems with extended reach using a physical layer reach extension device, such as a regenerator or optical amplifier in the fiber link between an OLT and an ONU.

SUMMARY

According to a first aspect of the present disclosure, there is provided a method for identifying a connection between a reach extender channel termination (RE-CT) and an ONU. The method includes transmitting, by an optical line terminal (OLT), a dynamic bandwidth allocation (DBA) grant to the ONU via a multi-channel termination reach extender (MCRE); retrieving, by the OLT from the MCRE, recorded optical signal power measurements associated with an upstream transmission by the ONU; and identifying, by the OLT, the RE-CT of the MCRE that is connected to the ONU by correlating the recorded optical signal power measurements associated with the upstream transmission by the ONU with the DBA grant.

According to the first aspect, the DBA grant enables the OLT to control an averaged transmitting power of the ONU in a time window. For example, in one embodiment, the DBA grant may enable the ONU to transmit during all timeslots in a time window. In certain embodiments, the process of retrieving the recorded optical signal power measurements associated with the upstream transmission by the ONU includes retrieving a total optical receive signal level table attribute in a physical path termination point (PPTP) reach extender (RE) user-network interface (UNI) managed entity (ME) that contains the recorded optical signal power measurements associated with an upstream transmission by the ONU. In one embodiment, only the RE-CT connected to the ONU reports the recorded optical signal power measurements associated with the upstream transmission by the ONU in response to the OLT retrieving the recorded optical signal power measurements associated with an upstream transmission by the ONU.

According to a second aspect of the present disclosure, there is provided a method for identifying a connection between a RE-CT and an ONU. The method includes transmitting, by an OLT, a ranging bandwidth assignment grant to the ONU via a MCRE; retrieving, by the OLT from the MCRE, an ONU identifier (ID) value of the ONU that transmits an upstream burst in a ranging bandwidth during a ranging assignment period; and identifying, by the OLT, the RE-CT of the MCRE that is connected to the ONU by correlating the ONU ID value of the ONU with the RE-CT that recorded the ONU ID value of the ONU.

According to the second aspect, the retrieving the ONU ID value of the ONU that transmits the upstream burst in the ranging bandwidth during the ranging assignment period includes retrieving a text table of a physical path termination point (PPTP) reach extender (RE) user-network interface (UNI) managed entity (ME). In certain embodiments, the PPTP RE UNI ME includes an ONU amount attribute that indicates a number of ONUs connected to a RE UNI. In certain embodiments, the ONU amount attribute is 2 bytes. In certain embodiments, the ONU amount attribute is a mandatory attribute. In certain embodiments, the PPTP RE UNI ME includes an Information Portal of Connected ONUs text table attribute that is used to pass a textual representation of information list of connected ONUs per RE UNI. In certain embodiments, retrieving the ONU ID value of the ONU that transmits the upstream burst in the ranging bandwidth during the ranging assignment period includes executing a GET command using the Information Portal of Connected ONUs text table attribute. In certain embodiments, the Information Portal of Connected ONUs text table attribute is an unspecified size. In certain embodiments, the Information Portal of Connected ONUs text table attribute is a mandatory attribute.

According to a third aspect of the present disclosure, there is provided an optical line terminal (OLT) comprising a memory configured to store computer-executable instructions, and a processor configured to execute the computer-executable instructions to cause the OLT to transmit a dynamic bandwidth allocation (DBA) grant to an optical network unit (ONU) via a multi-channel termination reach extender (MCRE), retrieve, from the MCRE, recorded optical signal power measurements associated with an upstream transmission by the ONU, and identify a reach extender channel termination (RE-CT) of the MCRE that is connected to the ONU by correlating the recorded optical signal power measurements associated with the upstream transmission by the ONU with the DBA grant.

According to the third aspect, the DBA grant enables the OLT to control an averaged transmitting power of the ONU in a time window. For example, in one embodiment, the DBA grant may enable the ONU to transmit during all timeslots in a time window. In certain embodiments, the process of retrieving the recorded optical signal power measurements associated with the upstream transmission by the ONU includes retrieving a total optical receive signal level table attribute in a physical path termination point (PPTP) reach extender (RE) user-network interface (UNI) managed entity (ME) that contains the recorded optical signal power measurements associated with an upstream transmission by the ONU. In one embodiment, only the RE-CT connected to the ONU reports the recorded optical signal power measurements associated with the upstream transmission by the ONU in response to the OLT retrieving the record According to a fourth aspect of the present disclosure, there is provided an optical line terminal (OLT) comprising a memory configured to store computer-executable instructions, and a processor configured to execute the computer-executable instructions to cause the OLT to transmit a ranging bandwidth assignment grant to an optical network unit (ONU) via a multi-channel termination reach extender (MCRE), retrieve, from the MCRE, an ONU identifier (ID) value of the ONU that transmits an upstream burst in a ranging bandwidth during a ranging assignment period, and identify the RE-CT of the MCRE that is connected to the ONU by correlating the ONU ID value of the ONU with the RE-CT that recorded the ONU ID value of the ONU.

According to the fourth aspect, the retrieving the ONU ID value of the ONU that transmits the upstream burst in the ranging bandwidth during the ranging assignment period includes retrieving a text table of a physical path termination point (PPTP) reach extender (RE) user-network interface (UNI) managed entity (ME). In certain embodiments, the PPTP RE UNI ME includes an ONU amount attribute that indicates a number of ONUs connected to a RE UNI. In certain embodiments, the ONU amount attribute is 2 bytes. In certain embodiments, the ONU amount attribute is a mandatory attribute. In certain embodiments, the PPTP RE UNI ME includes an Information Portal of Connected ONUs text table attribute that is used to pass a textual representation of information list of connected ONUs per RE UNI. In certain embodiments, retrieving the ONU ID value of the ONU that transmits the upstream burst in the ranging bandwidth during the ranging assignment period includes executing a GET command using the Information Portal of Connected ONUs text table attribute. In certain embodiments, the Information Portal of Connected ONUs text table attribute is an unspecified size. In certain embodiments, the Information Portal of Connected ONUs text table attribute is a mandatory attribute.

It should be understood that embodiments of this disclosure further include all combinations of the items discussed above.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module as referenced herein may comprise one or more hardware or electrical components such as electrical circuitry, processors, and memory. The memory may be volatile memory or non-volatile memory that stores data such as, but not limited to, computer executable instructions, machine code, and other various forms of data. The module may be configured to use the data to execute one or more instructions to perform one or more tasks.

Also, as referenced herein, the term "communicatively coupled" means capable of sending and/or receiving data over one or more communication links. In certain embodiments, the communication links may also encompass internal communication between various components of a system and/or with an external input/output device such as a keyboard or display device. Additionally, the communication links may include both wired and wireless links, and may be a direct link or may comprise multiple links passing through one or more communication network devices such as, but not limited to, routers, firewalls, servers, and switches. The network device may be located on various types of networks.

A network as referenced herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and radio access networks (RANs). The networks may include one or more private networks and/or public networks such as the Internet. The networks may employ any type of communication standards and/or protocol.

Currently, an OLT does not provide RE-ONU connectivity information. This presents several issues as will be further described herein. To address these issues, the present disclosure includes various embodiments for identifying a connection between a RE-CT and an ONU. For instance, a first method for identifying a connection between a RE-CT and an ONU is disclosed that includes the steps of transmitting, by the OLT, a DBA grant to the ONU via a multi-channel termination reach extender (MCRE); retrieving, by the OLT from the MCRE, recorded optical signal power measurements associated with an upstream transmission by the ONU; and identifying, by the OLT, the RE-CT of the MCRE that is connected to the ONU by correlating the recorded optical signal power measurements associated with the upstream transmission by the ONU with the DBA grant. A second method for identifying a connection between a RE-CT and an ONU is also disclosed. The second method includes transmitting, by an OLT, a ranging bandwidth assignment grant to the ONU via a MCRE; retrieving, by the OLT from the MCRE, an ONU identifier (ID) value of the ONU that transmits an upstream burst in a ranging bandwidth during a ranging assignment period; and identifying, by the OLT, the RE-CT of the MCRE that is connected to the ONU by correlating the ONU ID value of the ONU with the RE-CT that recorded the ONU ID value of the ONU. Additional variations and advantages of the disclosed embodiments will be recognized and described in the below details.

Figure 1:
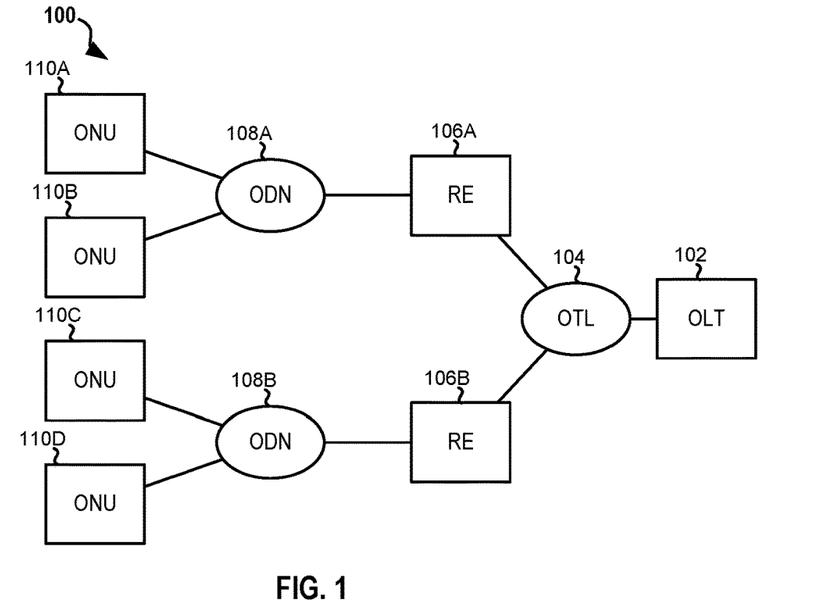
FIG. 1 is a schematic diagram illustrating a PON that uses single port REs for connecting an OLT to a plurality of ONUs in accordance with various embodiments of the present disclosure.

FIG. 1 is a schematic diagram illustrating a PON 100 that uses single port REs for connecting an OLT to a plurality of ONUs in accordance with various embodiments of the present disclosure. The PON 100 includes an OLT 102, an optical trunk line (OTL) 104, RE 106A, RE 106B, optical distribution network (ODN) 108A, ODN 108B, ONU 110A, ONU 110B, ONU 110C, and ONU 110D (collectively ONUs 110).

The OLT 102 is a device that serves as a service provider endpoint of the PON 100 and is typically located at the service provider's central office, but it may also be located at other suitable locations. The OLT 102 may act as an intermediary between other networks and the ONUs 110. For instance, the OLT 102 may be configured to forward data received from the other network to the ONUs 110 and vice-versa. The OLT 102 may be configured to convert signals used by a service provider to the frequency and framing used by the PON 100. The OLT 102 may also be configured to coordinate the multiplexing between the conversion devices on the ONUs 110.

As depicted in FIG. 1, the OLT 102 is communicatively coupled to the OTL 104, which is communicatively coupled to RE 106A and RE 106B. The OTL 104 is fiber optic line. The RE 106A and RE 106B are used to extend the reach of the PON 100 (connection between the OLT 102 and the ONUs 110) by the length of the OTL 104, and may also increase the split ratio of the PON 100. The RE 106A and RE 106B may include an optical amplifier, an optical-electrical-optical (OEO) regenerator, and/or a combination thereof. An optical amplifier provides a gain in optical power. An OEO regenerator receives an optical signal, reshapes and retimes it in the electrical domain, and retransmits in the optical domain.

In the depicted embodiment, the RE 106A is a single port RE that is communicatively coupled to ODN 108B, which in turn is communicatively coupled to ONU 110A and ONU 110B in the example. Similarly, the RE 106B is a single port RE that is communicatively coupled to ODN 108A, which in turn is communicatively coupled to ONU 110C and ONU 110D.

The ODN 108A and ODN 108B (collectively the ODNs 108) are data distribution systems that provide the optical transmission medium for the physical connection of the ONUs 110 and the OLT 102. The ODNs 108 may include optical fiber cables, couplers, splitters, distributors, and other suitable components. The components include passive optical components that do not require power to distribute signals between the OLT 102 and the ONUs 110. Alternatively, the components include active components such as optical amplifiers that do require power. The ODNs 108 extend from the OLT 102 to the ONUs 110 in a branching configuration as shown, but the ODNs 108 may be configured in any other suitable point-to-multipoint (P2MP) configuration.

The ONUs 110 are typically located at distributed locations such as customer premises, but they may also be located at other suitable locations. The ONUs 110 communicate with the OLT 102 and its customers, and act as intermediaries between the OLT 102 and the customers. The ONUs 110 may be configured to convert optical signals received from the OLT 102 to electrical signals. The ONUs 110 may also be configured to send, aggregate, and optimize various types of data and send it upstream to the OLT 102.

Figure 2:
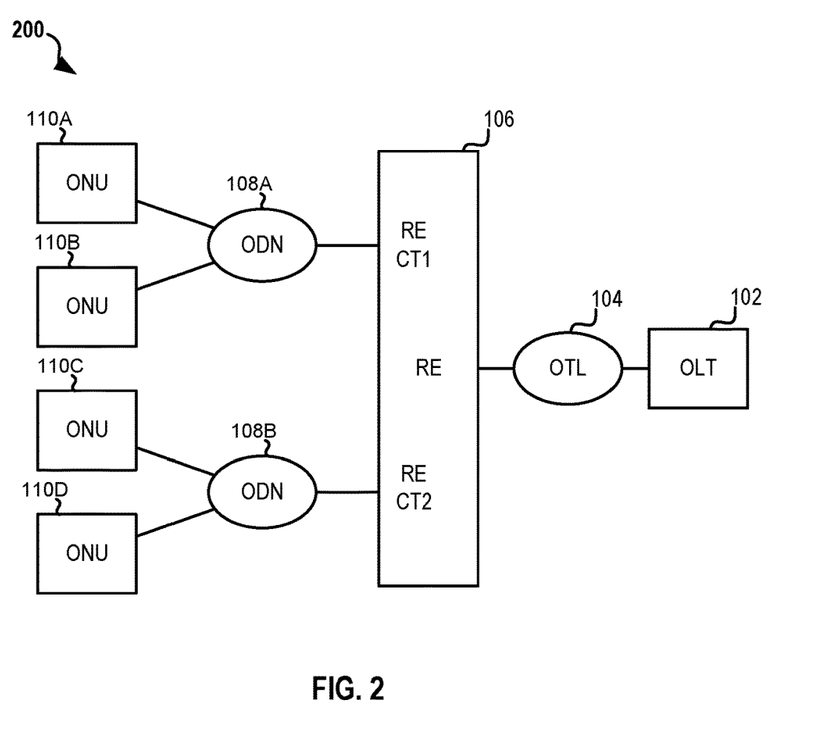
FIG. 2 is a schematic diagram illustrating a PON that uses MCREs for connecting an OLT to a plurality of ONUs in accordance with various embodiments of the present disclosure.

FIG. 2 is a schematic diagram illustrating a PON 200 that uses a multi-channel termination reach extender (MCRE) 106 for connecting the OLT 102 to the ONUs 110 in accordance with various embodiments of the present disclosure. The MCRE 106 may include an optical splitter that splits the input signal from the OLT 102 (and/or the OTL 104) into multiple output ports/channels (referred to herein as a reach extender channel termination (RE-CT)). For example, in the depicted embodiment, the MCRE 106 includes two RE-CTs: RE-CT1 and RE-CT2. In some embodiments, the MCRE 106 may include more than two RE-CTs. Each RE-CT of the MCRE 106 is respectively communicatively coupled to an ODN. For instance, in FIG. 2, RE-CT1 is communicatively coupled to ODN 108A, and RE-CT2 is communicatively coupled to ODN 108B. Thus, by using MCRE 106, a single RE may be used in place of multiple single port REs.

While the PON 200 architecture in FIG. 2 has its advantages, it may also present some issues because current OLTs do not provide RE-ONU connectivity information. For example, field engineers often use a handheld device connected to a branch fiber to read link loss values in downstream frames. Each RE-CT may transmit with a different launch power to support a different ODN class. The transmitted optical level (TOL) value in current standards is originated from the OLT and represents one RE-CT. Therefore, field engineers cannot acquire the correct TOL value from a branch fiber.

Thus, field engineers need to know the RE-CT to ONU connection information in the downstream when testing branches to ensure that the test device is testing the correct branch. Accordingly, the present disclosure includes various embodiments for identifying a connection between a RE-CT and an ONU, as further described herein.

Figure 3:
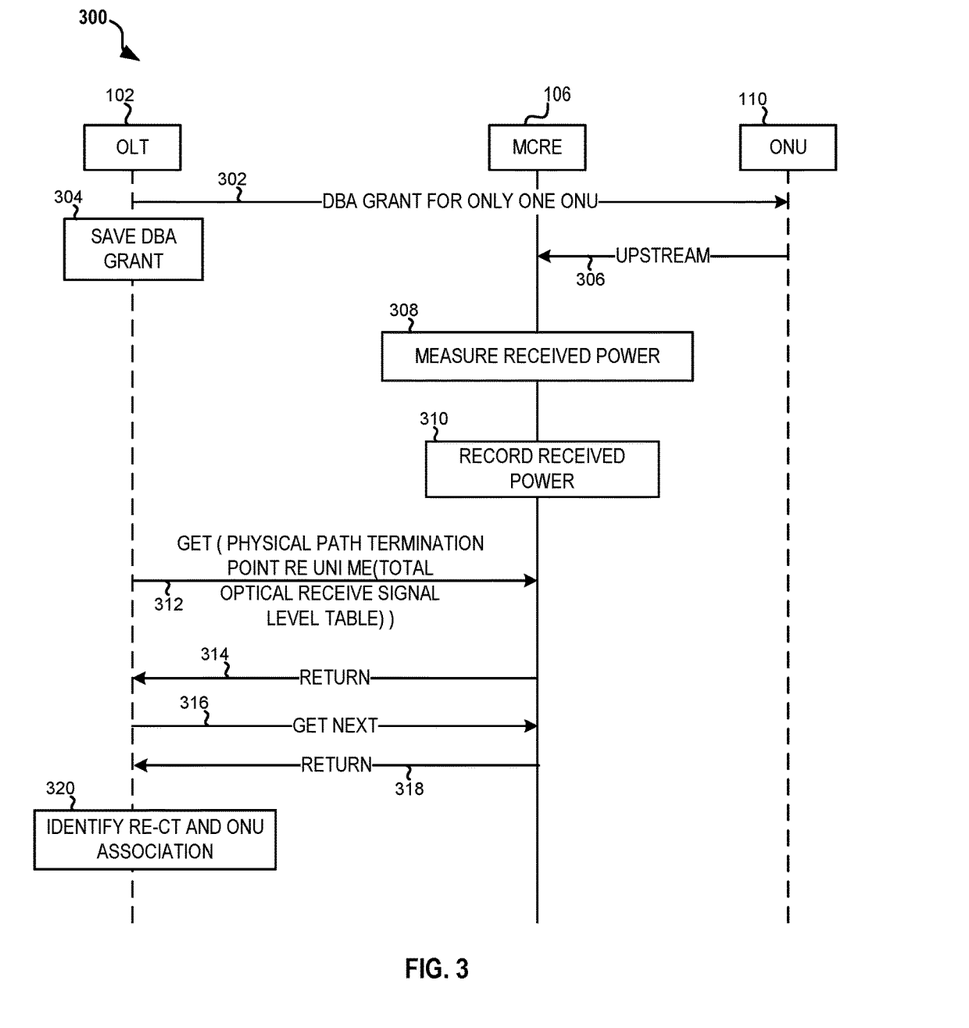
FIG. 3 is a sequence diagram illustrating a first method for identifying a connection between a RE-CT and an ONU in accordance with an embodiment of the present disclosure.

FIG. 3 is a sequence diagram 300 illustrating a first method for identifying a connection between a RE-CT and an ONU in accordance with an embodiment of the present disclosure. The sequence diagram 300 begins with the OLT 102 sending, at step 302, a DBA grant for only one ONU. The DBA grant is received by ONU 110 via the MCRE 106. In one embodiment, the DBA grant enables the OLT 102 to control an averaged transmitting power of the ONU 110 in (or during) a time window. For example, in one embodiment, the DBA grant enables the ONU to transmit during all timeslots in the time window. The OLT 102 saves the DBA at step 304, such as in a buffer or memory, for example.

At step 306, the ONU 110 transmits upstream data to the MCRE 106 in accordance with the DBA grant. At step 308, the RE-CT of the MCRE 106 that is connected to the ONU 110 is configured to measure the received power variations. At step 310, the received power results are recorded by the MCRE 106. In one embodiment, the MCRE 106 records the received power results in a total optical receive signal level table attribute in the physical path termination point (PPTP) reach extender (RE) user-network interface (UNI) managed entity (ME). The PPTP RE UNI ME represents the point where the physical path terminates and indicates the RE-CT of the MCRE 106 that is connected to the ONU 110.

At step 312, the OLT 102 retrieves from the MCRE 106 the recorded optical signal power measurements associated with the upstream transmission by the ONU 110. For example, in one embodiment, the OLT 102 transmits a GET command to the MCRE 106 to retrieve the total optical receive signal level table of a PPTP RE UNI ME, which is returned to the OLT 102 at step 314. At step 316, the OLT 102 transmits another GET command to the MCRE 106 to retrieve the total optical receive signal level table of a next PPTP RE UNI ME of the MCRE 106, the results of the GET command is returned at step 318. This process continues until the OLT 102 obtains all of the total optical receive signal level table of each of the PPTP RE UNI ME of the MCRE 106.

At step 320, the OLT 102 identifies the RE-CT of the MCRE 106 that is connected to the ONU 110. In an embodiment, the OLT 102 identifies the RE-CT by correlating the recorded optical signal power measurements associated with the upstream transmission by the ONU 100 with the DBA grant. For example, if the DBA grant allowed the ONU 110 to transmit at a certain transmitting power during a certain time window or allowed only the ONU 110 to transmit during the time window, only the recorded optical signal power measurements associated with RE-CT that is connected to the ONU 110 would report the expected value. One advantage of the disclosed first method is that it does not require adding any new attributes to a PPTP RE UNI ME nor new MEs.

Figure 4:
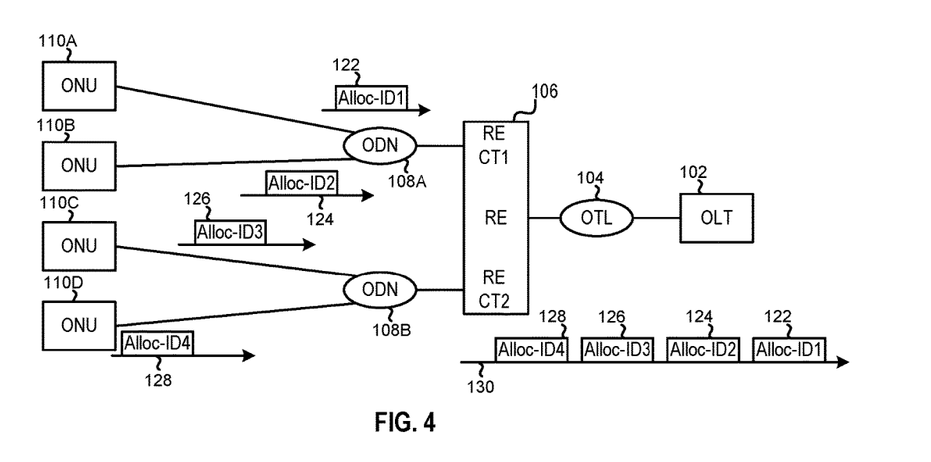
FIG. 4 illustrates an example of a normal DBA grant in accordance with an embodiment of the present disclosure.

FIG. 4 illustrates an example of a normal DBA grant in accordance with an embodiment of the present disclosure. In the depicted embodiment, the OLT 102 broadcast the same data downstream to each of the ONUs 110. Each of the ONUs 110 may be configured to recognize any data specifically targeted for it by filtering the downstream data using its ONU/allocation identifier (Alloc-ID). For upstream data, the OLT 102 uses time-division multiplexing (TDM) to manage and grant timeslots in which each of the ONUs 110 is allowed to transmit data to the OLT 102. The OLT 102 determines the distance and time delay of each of the ONUs 110. The OLT 102 divides the total available bandwidth between each of the ONUs 110 so each ONU 110 gets a fraction and is able to transmit upstream data during a given time cycle. For example, in the depicted embodiment, ONU 110A is able to transmit upstream data 122 during a first granted timeslot of an upstream cycle, ONU 110B is able to transmit upstream data 124 during a second granted timeslot of the upstream cycle, ONU 110C is able to transmit upstream data 126 during a third granted timeslot of an upstream cycle, and ONU 110D is able to transmit upstream data 128 during a fourth granted timeslot of an upstream cycle. The OLT 102 receives upstream data 130 comprising the upstream data 122, upstream data 124, upstream data 126, and upstream data 128.

Figure 5:
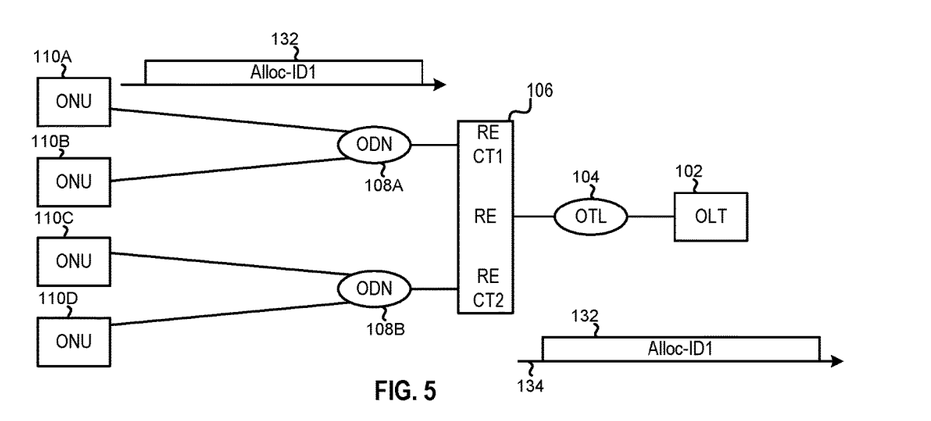
FIG. 5 illustrates an example of a special DBA grant in accordance with an embodiment of the present disclosure.

FIG. 5 illustrates an example of a special DBA grant in accordance with an embodiment of the present disclosure. In the depicted embodiment, the OLT 102 transmits a DBA grant that enables the ONU 110A to transmit during all timeslots in a time window. As shown in FIG. 5, the ONU 110A transmits upstream data 132 during the entire upstream cycle. The OLT 102 receives upstream data 134 comprising only the upstream data 132. As described above, in accordance with an embodiment; the special DBA grant enables the OLT 102 to identify the RE-CT of the MCRE 106 that is connected to the ONU 110 by retrieving from the MCRE 106 the recorded optical signal power measurements associated with an upstream transmission by the ONU 110, and correlating the recorded optical signal power measurements associated with the upstream transmission by the ONU 100 with the DBA grant.

Figure 6:
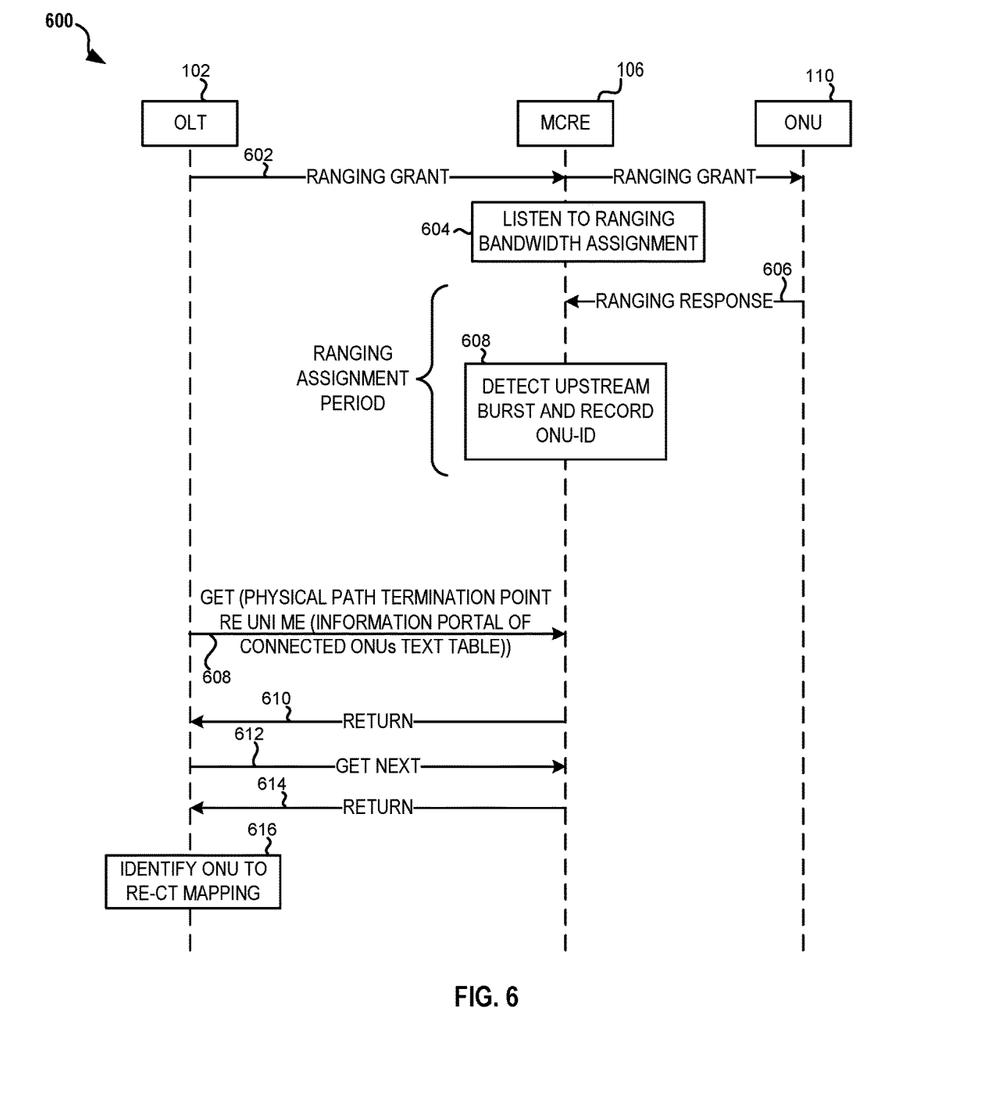
FIG. 6 is a sequence diagram illustrating a second method for identifying a connection between a RE-CT and an ONU in accordance with an embodiment of the present disclosure.

FIG. 6 is a sequence diagram 600 illustrating a second method for identifying a connection between a RE-CT and an ONU. The sequence diagram 600 begins at step 602 with the OLT 102 sending a ranging DBA grant to the ONU 110 via the MCRE 106. At step 604, each RE-CT of the MCRE 106 listens to the ranging bandwidth assignment from the OLT 102. At step 606, if during the ranging assignment period a RE-CT of the MCRE 106 receives a ranging response from the ONU 110, the RE-CT detects the upstream burst and records the ONU-ID (or serial numbers) of the associated ONU corresponding to the upstream burst in a text table. In one embodiment, the MCRE 106 records the ONU-ID in an information portal of connected ONUs text table attribute in the PPTP RE UNI ME.

At step 608, the OLT 102 retrieves, from the MCRE 106, the information portal of connected ONUs text table. For example, in one embodiment, the OLT 102 transmits a GET command to the MCRE 106 to retrieve the information portal of connected ONUs text table of a PPTP RE UNI ME, which is returned to the OLT 102 at step 610. At step 612, the OLT 102 transmits another GET command to the MCRE 106 to retrieve the information portal of connected ONUs text table of a next PPTP RE UNI ME of the MCRE 106. The result or results of the GET command is returned at step 614. This process continues until the OLT 102 obtains all the information portal of connected ONUs text table of each of the PPTP RE UNI ME of the MCRE 106. At step 616, the OLT 102 identifies the RE-CT of the MCRE that is connected to the ONU by correlating ONU-ID with RE-CT.

Figure 7:
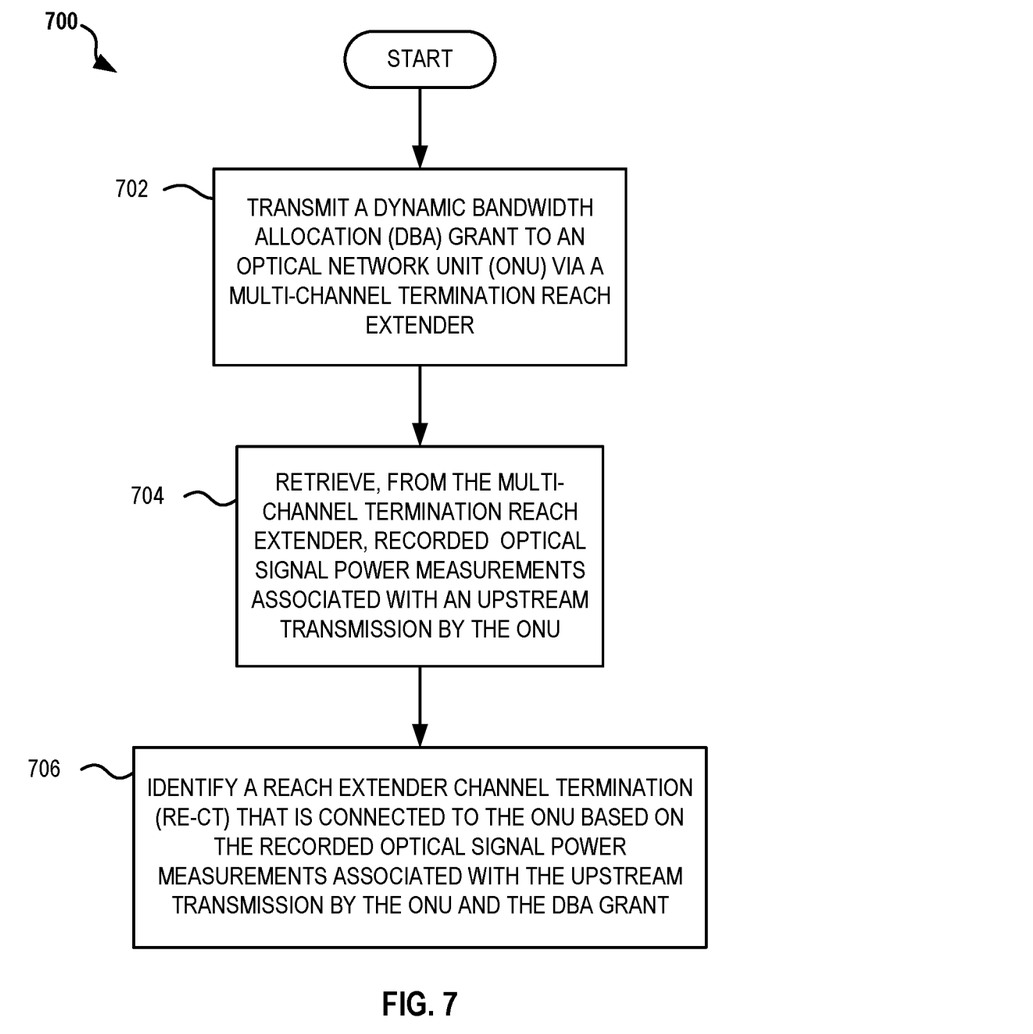
FIG. 7 is a flowchart illustrating the first method performed by an OLT for identifying a connection between a RE-CT and an ONU in accordance with an embodiment of the present disclosure.

FIG. 7 is a flowchart illustrating a method 700 performed by an OLT for identifying a connection between a RE-CT and an ONU. The method 700 begins at step 702 by transmitting, by the OLT 102, a DBA grant to the ONU 110 via a MCRE 106. The DBA grant enables the OLT 102 to control an averaged transmitting power of the ONU 110 in a time window, such as enabling only the ONU 110 to transmit during all timeslots of or during the time window. The method 700 at step 704 retrieves, from the MCRE 106, recorded optical signal power measurements associated with an upstream transmission by the ONU 110. In one embodiment, this may involve retrieving a total optical receive signal level table attribute in a PPTP RE UNI ME that contains the recorded optical signal power measurements associated with an upstream transmission by the ONU 110. The method 700 at step 706 identifies the RE-CT of the MCRE 106 that is connected to the ONU 110 by correlating the recorded optical signal power measurements (associated with the upstream transmission by the ONU 110) with the DBA grant.

Figure 8:
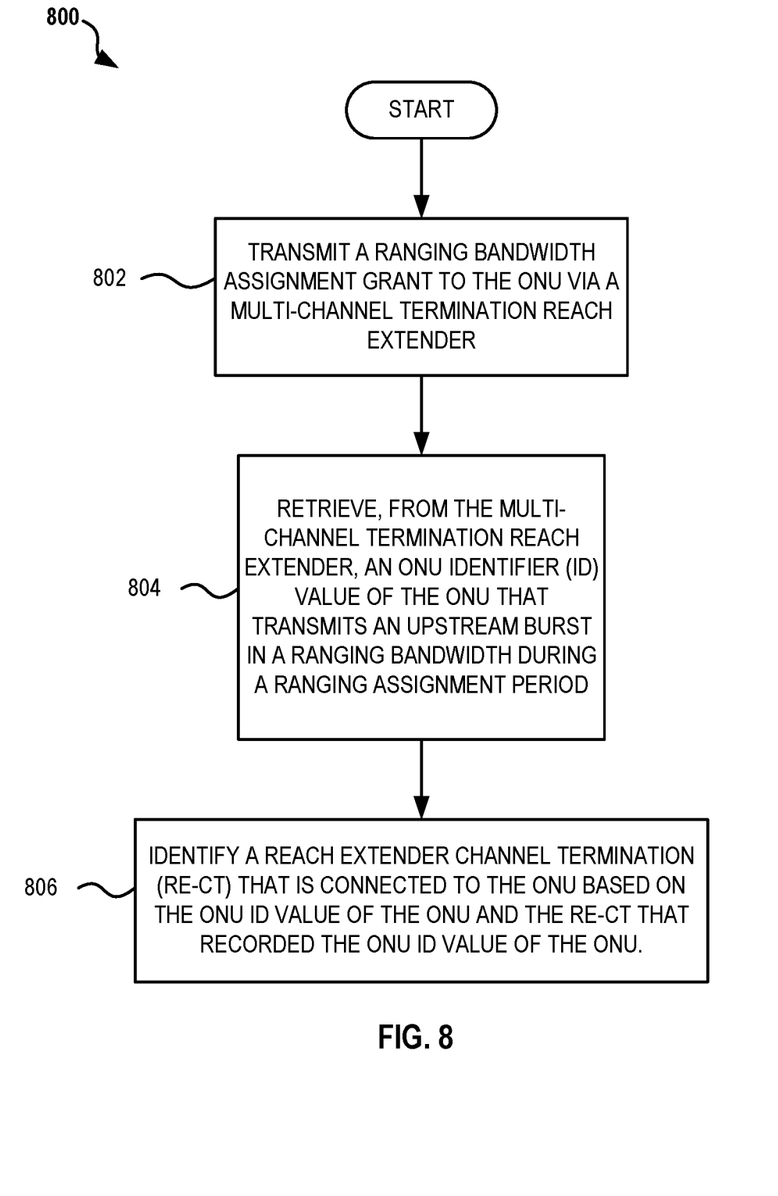
FIG. 8 is a flowchart illustrating the second method performed by an OLT for identifying a connection between a RE-CT and an ONU in accordance with an embodiment of the present disclosure.

FIG. 8 is a flowchart illustrating a method 800 performed by an OLT for identifying a connection between a RE-CT and an ONU. The method 800 begins at step 802 by transmitting, by the OLT, a ranging bandwidth assignment grant to the ONU, via a MCRE. The method 800 at step 804 retrieves, from the MCRE, an ONU-ID value of the ONU that transmits an upstream burst in a ranging bandwidth during a ranging assignment period. In one embodiment, this may involve retrieving a text table of a PPTP RE UNI ME that stores the ONU-ID value of the ONU. In one embodiment, the PPTP RE UNI ME may also include an ONU amount attribute that indicates a number of ONUs connected to a RE UNI. In certain embodiments, the ONU amount attribute is 2 bytes and may be a mandatory attribute of the PPTP RE UNI ME. In some embodiments, the PPTP RE UNI ME includes an information portal of connected ONUs text table attribute that is used to pass a textual representation of an information list of connected ONUs per RE UNI. The information portal of connected ONUs text table attribute may be an unspecified size and may also be a mandatory attribute. Referring back to the flowchart, at step 806, the method 800 identifies the RE-CT of the MCRE that is connected to the ONU by correlating the ONU ID value of the ONU with the RE-CT that recorded the ONU ID value of the ONU.

Figure 9:
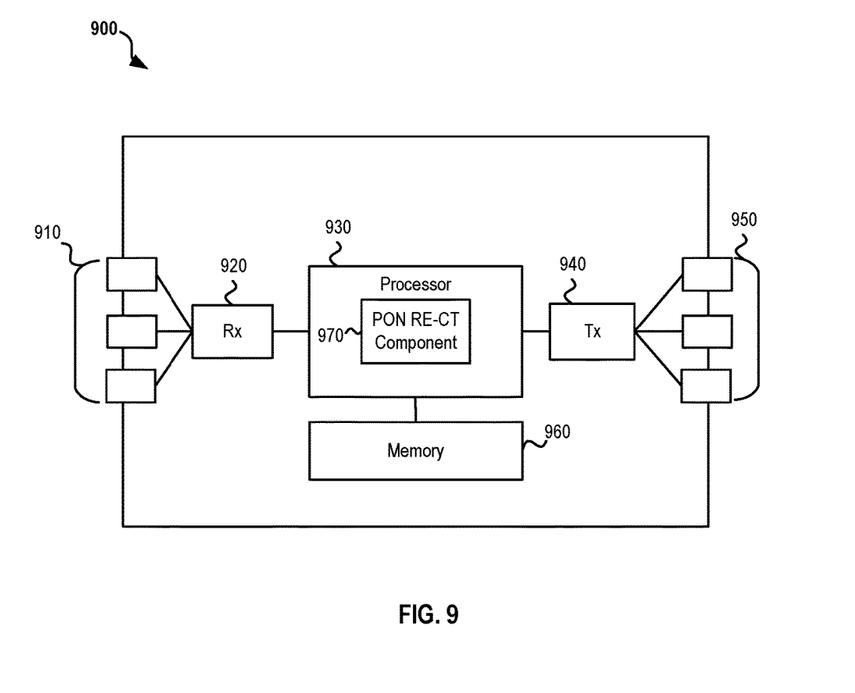
FIG. 9 is a schematic diagram of an apparatus in accordance with an embodiment of the present disclosure.

FIG. 9 is a schematic diagram of a device 900 according to an embodiment of the disclosure. The device 900 may be used to implement the disclosed embodiments. For example, in one embodiment, the device 900 may be used to implement the OLT 102. The device 900 comprises ingress ports 910 and an receiver (Rx) 920 coupled to the ingress ports 910 for receiving data; a processor, logic unit, or CPU 930 coupled to the Rx 920 and operable to process the data; a transceiver (Tx) 940 coupled to the processor 930, and egress ports 950 coupled to the Tx 940 for transmitting the data. A memory 960 is coupled to the processor 930 for storing the data. The device 900 may also comprise optical to electrical (OE) converters and electrical to optical (EO) converters coupled to the ingress ports 910, the Rx 920, the Tx 940, and the egress ports 950 for ingress or egress of optical or electrical signals.

The processor 930 is any suitable combination of hardware, middleware, firmware, or software. The processor 930 comprises any combination of one or more central processing unit (CPU) chips, cores, microcontroller (MCU), digital signal processor (DSP), field programmable gate array (FPGA) and application-specific integrated circuit (ASIC). The processor 930 communicates with the ingress ports 910, Rx 920, Tx 940, egress ports 950, and memory 960. The processor 930 comprises or implements a PON RE-CT component 970, which implements the disclosed embodiments. The inclusion of the PON RE-CT component 970 therefore provides a substantial improvement to the functionality of the device 900 and effects a transformation of the device 900 to a different state. Alternatively, the memory 960 stores the PON RE-CT component 970 as instructions, and the processor 930 executes those instructions.

The memory 960 comprises one or more disks, tape drives, or solid-state drives. The device 900 may use the memory 960 as an over-flow data storage device to store programs when the device 900 selects those programs for execution and to store instructions and data that the device 900 reads during execution of those programs. The memory 960 may any type of volatile and/or non-volatile memory, which is memory that has the capability to hold saved data without power.

Accordingly, the present disclosure includes various embodiments for identifying a connection between a RE-CT and an ONU. One advantage of the disclosed embodiments is that it ensures that field engineers are testing the correct branch of a PON. Additionally, in certain embodiments, this advantage may be achieved by making use of the existing grant mechanism of PON upstream transmissions, without adding new messages, MEs, or attributes to the current standards. Other advantages of the disclosed embodiments may also be recognized by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for identifying a connection between a reach extender channel termination (RE-CT) and an optical network unit (ONU), the method comprising:
   transmitting, by an optical line terminal (OLT), a dynamic bandwidth allocation (DBA) grant to the ONU via a multi-channel termination reach extender (MCRE);
   retrieving, by the OLT from the MCRE, recorded optical signal power measurements associated with an upstream transmission by the ONU; and
   identifying, by the OLT, the RE-CT of the MCRE that is connected to the ONU by correlating the recorded optical signal power measurements associated with the upstream transmission by the ONU with the DBA grant.

2. The method of claim 1, wherein the DBA grant enables the OLT to control an averaged transmitting power of the ONU in a time window.

3. The method of claim 1, wherein the DBA grant enables the ONU to transmit during all timeslots in a time window.

4. The method of claim 1, wherein retrieving the recorded optical signal power measurements associated with the upstream transmission by the ONU comprises retrieving a total optical receive signal level table attribute in a physical path termination point (PPTP) reach extender (RE) user-network interface (UNI) managed entity (ME) that contains the recorded optical signal power measurements associated with an upstream transmission by the ONU.

5. The method of claim 1, wherein only the RE-CT connected to the ONU reports the recorded optical signal power measurements associated with the upstream transmission by the ONU in response to the OLT retrieving the recorded optical signal power measurements associated with an upstream transmission by the ONU.

6. A method for identifying a connection between a reach extender channel termination (RE-CT) and an optical network unit (ONU), the method comprising:
   transmitting, by an optical line terminal (OLT), a ranging bandwidth assignment grant to the ONU via a multi-channel termination reach extender (MCRE);
   retrieving, by the OLT from the MCRE, an ONU identifier (ID) value of the ONU that transmits an upstream burst in a ranging bandwidth during a ranging assignment period; and
   identifying, by the OLT, the RE-CT of the MCRE that is connected to the ONU by correlating the ONU ID value of the ONU with the RE-CT that recorded the ONU ID value of the ONU.

7. The method of claim 6, wherein retrieving the ONU ID value of the ONU that transmits the upstream burst in the ranging bandwidth during the ranging assignment period comprises retrieving a text table of a physical path termination point (PPTP) reach extender (RE) user-network interface (UNI) managed entity (ME).

8. The method of claim 7, wherein the PPTP RE UNI ME includes an ONU amount attribute that indicates a number of ONUs connected to a RE UNI.

9. The method of claim 8, wherein the ONU amount attribute is 2 bytes.

10. The method of claim 8, wherein the ONU amount attribute is a mandatory attribute.

11. The method of claim 7, wherein the PPTP RE UNI ME includes an Information Portal of Connected ONUs text table attribute that is used to pass a textual representation of information list of connected ONUs per RE UNI.

12. The method of claim 11, wherein retrieving the ONU ID value of the ONU that transmits the upstream burst in the ranging bandwidth during the ranging assignment period comprises executing a GET command using the Information Portal of Connected ONUs text table attribute.

13. The method of claim 11, wherein the Information Portal of Connected ONUs text table attribute is an unspecified size.

14. The method of claim 11, wherein the Information Portal of Connected ONUs text table attribute is a mandatory attribute.

15. An optical line terminal (OLT) comprising a memory configured to store computer-executable instructions, and a processor configured to execute the computer-executable instructions to cause the OLT to:
   transmit a dynamic bandwidth allocation (DBA) grant to an optical network unit (ONU) via a multi-channel termination reach extender (MCRE);
   retrieve, from the MCRE, recorded optical signal power measurements associated with an upstream transmission by the ONU; and
   identify a reach extender channel termination (RE-CT) of the MCRE that is connected to the ONU by correlating the recorded optical signal power measurements associated with the upstream transmission by the ONU with the DBA grant.

16. The OLT of claim 15, wherein the DBA grant enables the OLT to control an averaged transmitting power of the ONU in a time window.

17. The OLT of claim 15, wherein the DBA grant enables the ONU to transmit during all timeslots in a time window.

18. The OLT of claim 15, wherein retrieving the recorded optical signal power measurements associated with the upstream transmission by the ONU comprises retrieving a total optical receive signal level table attribute in a physical path termination point (PPTP) reach extender (RE) user-network interface (UNI) managed entity (ME) that contains the recorded optical signal power measurements associated with an upstream transmission by the ONU.

19. The OLT of claim 15, wherein only the RE-CT connected to the ONU reports the recorded optical signal power measurements associated with the upstream transmission by the ONU in response to the OLT retrieving the recorded optical signal power measurements associated with an upstream transmission by the ONU.

20. An optical line terminal (OLT) comprising a memory configured to store computer-executable instructions, and a processor configured to execute the computer-executable instructions to cause the OLT to:
   transmit a ranging bandwidth assignment grant to an optical network unit (ONU) via a multi-channel termination reach extender (MCRE);
   retrieve, from the MCRE, an ONU identifier (ID) value of the ONU that transmits an upstream burst in a ranging bandwidth during a ranging assignment period; and
   identify the RE-CT of the MCRE that is connected to the ONU by correlating the ONU ID value of the ONU with the RE-CT that recorded the ONU ID value of the ONU.

21. The OLT of claim 20, wherein retrieving the ONU ID value of the ONU that transmits the upstream burst in the ranging bandwidth during the ranging assignment period comprises retrieving a text table of a physical path termination point (PPTP) reach extender (RE) user-network interface (UNI) managed entity (ME).

22. The OLT of claim 21, wherein the PPTP RE UNI ME includes an ONU amount attribute that indicates a number of ONUs connected to a RE UNI.

23. The OLT of claim 22, wherein the ONU amount attribute is 2 bytes.

24. The OLT of claim 22, wherein the ONU amount attribute is a mandatory attribute.

25. The OLT of claim 21, wherein the PPTP RE UNI ME includes an Information Portal of Connected ONUs text table attribute that is used to pass a textual representation of information list of connected ONUs per RE UNI.

26. The OLT of claim 25, wherein retrieving the ONU ID value of the ONU that transmits the upstream burst in the ranging bandwidth during the ranging assignment period comprises executing a GET command using the Information Portal of Connected ONUs text table attribute.

27. The OLT of claim 25, wherein the Information Portal of Connected ONUs text table attribute is an unspecified size.

28. The OLT of claim 25, wherein the Information Portal of Connected ONUs text table attribute is a mandatory attribute.

* * * * *

UNITED STATES PATENT AND TRADEMARK OFFICE
CERTIFICATE OF CORRECTION

PATENT NO. : 10,256,910 B2
APPLICATION NO. : 15/938858
DATED : April 9, 2019
INVENTOR(S) : Bo Gao et al.

Page 1 of 1

It is certified that error appears in the above-identified patent and that said Letters Patent is hereby corrected as shown below:

On the Title Page

Page 2, item [56], Other Publications, Lines 14-17, should read:
"10-Gigabit-Capable Symmetric Passive Optical Network (XGS-PON)," Series G: Transmission Systems and Media, Digital Systems and Networks - Access Networks - Optical Line Systems for Local and Access Networks, ITU-T G.9807.1, Jun. 2016, 286 pages.

Signed and Sealed this
Twenty-eighth Day of May, 2019

Andrei Iancu
*Director of the United States Patent and Trademark Office*